A. G. JOHNSON.
TIRE TOOL.
APPLICATION FILED NOV. 3, 1913.

1,122,599.

Patented Dec. 29, 1914.

Witnesses:
John Enders
L. C. French

Inventor:
Anders G. Johnson
by Fred Gerlach
his Atty.

UNITED STATES PATENT OFFICE.

ANDERS GUSTAV JOHNSON, OF CHICAGO, ILLINOIS.

TIRE-TOOL.

1,122,599.
Specification of Letters Patent.
Patented Dec. 29, 1914.

Application filed November 3, 1913. Serial No. 798,870.

*To all whom it may concern:*

Be it known that I, ANDERS GUSTAV JOHNSON, a resident of Chicago, in the county of Cook and State of Illinois, have invented certain new and useful Improvements in Tire-Tools, of which the following is a full, clear, and exact description.

The invention relates to tire tools and designs to provide a tool made in one piece, which is provided with means for loosening and replacing the outer casing of an automobile tire used on the usual form of rim.

The invention further designs to provide a new and improved tire tool.

The invention consists in the several features hereinafter set forth and more particularly defined by claim at the conclusion hereof.

Figure 1:
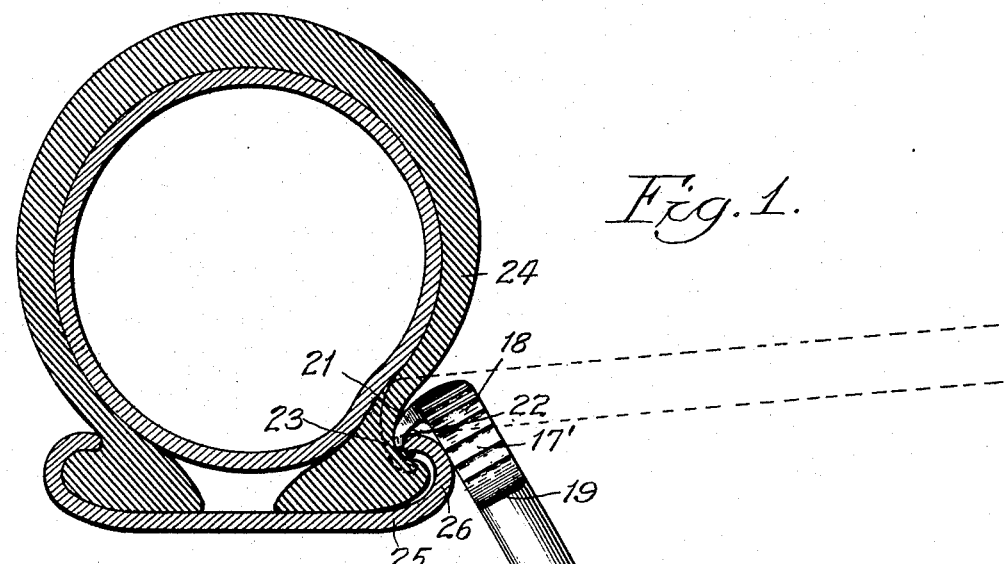
Figure 2:
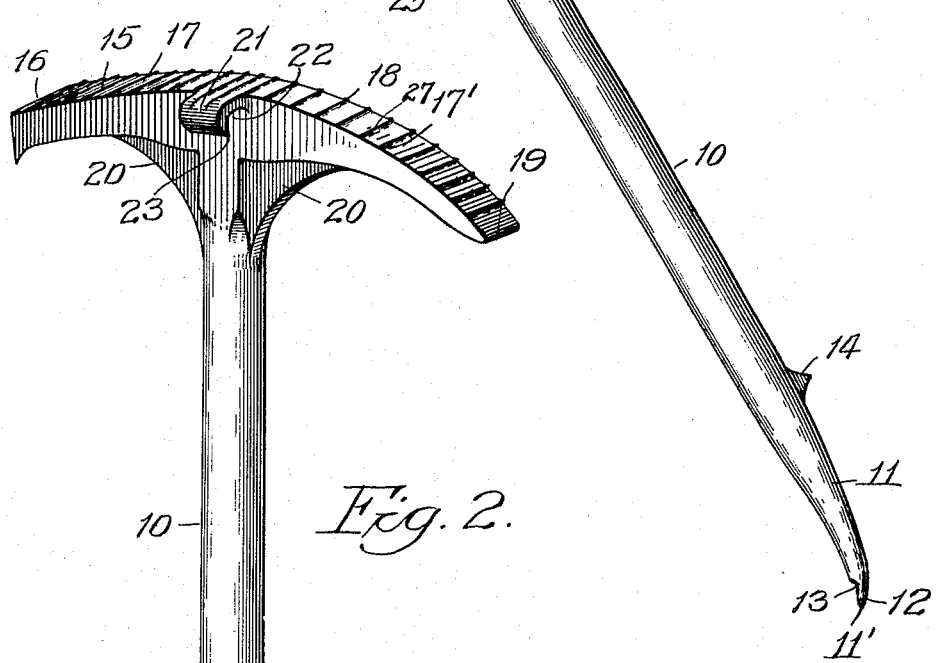

In the drawings: Figure 1 is a tool in use on the tire. Fig. 2 is a perspective view of the tool.

The tool comprises a handle member 10 one of the ends 11 of which is tapered down to a flat edge 11′, so as to provide a wedge-portion 12. This wedge-portion 12 is provided on one side with a notch 13 adjacent the edge 11′. On the side of the tapered portion 11 opposite to the notch 13 is a projection or hump 14. The wedge, notch and hump are used in replacing a tire on a rim, and in prying the tire over the rim flange the operation of which will be hereinafter described. At the other end of the handle member 10 is a hammer member 15 extending laterally in the plane of the handle member and provided with a hammer head 16. The outer side 17 of the laterally extending hammer member 15 is curved downwardly from the end adjacent the handle member to the hammer head 16. A chisel member 18 at the same end of the handle member 10 and oppositely positioned from the hammer member 15 extends laterally in the plane of the said handle member and is provided with a rounded end 19. The outer side 17′ of laterally extending chisel member 18 is curved similar to member 15 downwardly from the end adjacent the handle to the rounded end 19. The members 15, 17 and 10 are reinforced at their juncture by webs 20.

A hooked claw 21, extending laterally of the hammer and claw members 15 and 18 adjacent the handle member 10, extends outwardly and at right angles to the parts 15, 18, and 10. This claw is hooked at 22 and tapered at its end 23 so as to permit it to be inserted between the tire 24 and the rim 25 as shown in Fig. 1. The chisel and hammer members 15, 18 and the claw 21 coöperate in removing the tire from the rim flange. To remove the tire from the rim flange the claw 21 is inserted between the tire 24 and the rim 25 as shown in Fig. 1 and then by turning or wriggling the handle in a direction at right angles to the plane of the claw, the sides of the claw will bear against the tire and rim respectively and the claw will pivot on the rim as a fulcrum and pry that part of the tire against which it rests away from the rim. At the same time the outer curved sides of the laterally extending members 15 and 18 will be brought up against the tire and force it from the rim for a distance beyond these members. Should it be difficult to move the claw along the rim this movement may be assisted by striking the member 16 with a hammer while the claw 21 is in position between the rim and the tire. By repetition of inserting the claw along the rim between the rim and the tire, and wriggling the handle to cause the claw and the sides 17 and 17′ to exert their prying action the outer casing of the tire will be removed from the flanges 26 of the rim 25. The sides 17 and 17′ and the outer side of the hook 21 are roughened by providing ribs 27, which roughened surface secures a better grip of the tool on the tire.

Should the tire for any reason stick to the rim and the use of the claw be rendered difficult, the round edged chisel 18 will be placed against the tire at the junction of the tire and the rim-flange and by striking the hammer head 16 and moving the round edged chisel 18 along the rim at this junction, and repeating the operation, the tire will become loosened from the rim and permit the use of the claw 21 as previously described.

To replace the tire one side of the tire is first fitted on one side of the rim and the other side of the tire is placed on the rim by the use of the pry or wedge 12, the end of which may be placed on the edge of the rim with the notch 13 engaging said edge and by the movement of the handle in the plane at right angles to the tire rim, this side of the tire may be pried onto the rim. The hump 14 prevents the slipping of the tire from the tool while it is in use in replacing the tire upon the rim.

From the foregoing it will be seen that I have provided a simple and efficient tire tool which may be cast in one piece and which may be used in either removing or replacing an automobile tire on the rim.

The invention is not to be understood as restricted to the details set forth, since these may be modified within the scope of the appended claim without departing from the spirit and scope of the invention.

Having thus described the invention, what I claim as new and desire to secure by Letters Patent, is:

In a tire tool, the combination of a handle member, a rim-flange-engaging hook, and integral means extending laterally therefrom and adapted to engage the tire to remove the same from the rim, said hook being so curved that when inserted it will extend around and engage the under-surface of the rim-flange with the handle of the tool inclined downwardly, and said hook merging on its outer face into the outer faces of the integral laterally extending members, whereby the device will operate to force the tire from the rim as the handle is moved toward a horizontal position.

ANDERS GUSTAV JOHNSON.

Witnesses:
MILDRED STUMPF,
KATHERINE GERLACH.